Patented Oct. 16, 1934

1,976,924

UNITED STATES PATENT OFFICE 1,976,924

DIALKYL-AMINO-ALKYL-ESTERS OF ALKOXY-CARBOXY-DIPHENYLS

Walter G. Christiansen, Glen Ridge, N. J., and Adelbert W. Harvey, Pittsburgh, Pa., assignors to E. R. Squibb & Sons, Brooklyn, N. Y., a corporation of New York No Drawing. Application December 9, 1932, Serial No. 646,478

11 Claims. (Cl. 167—52)

This invention relates to dialkyl-amino-alkyl-esters of alkoxy-carboxy-diphenyls, and particularly to esters of 3-carboxy-diphenyl having an alkoxy group in the 2 or 4 position. The invention includes the esters, salts of the esters and anesthetics containing the esters or their salts.

In preparing these compounds, we start, for example, with an hydroxy derivative of a diphenyl carboxylic acid, convert it to the desired alkoxy derivative, form a halogen substituted alkyl ester from this, and then convert the ester to the desired dialkyl-amino-alkyl compound. The steps are indicated by the following equation in which R is an alkylene group and $R_1$, $R_2$ and $R_3$ are alkyl groups:

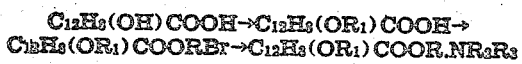

To form the dialkyl-amino-alkyl ester, instead of first forming a bromo-alkyl ester, the sodium salt of the acid may be converted directly to the dialkyl-amino-alkyl ester by reacting with a dialkyl-amino-alkyl halide, such as beta-diethyl-amino-ethyl chloride, etc. It may be possible to use other methods such as reacting an acyl chloride with a dialkyl-amino alcohol, etc.

In preparing derivatives of 3-carboxy-4-hydroxy-diphenyl, we prefer to make this starting material by the method disclosed in the application of Adelbert W. Harvey, Serial No. 615,473, filed June 4, 1932, as follows:

170 grams of 4-hydroxy-diphenyl is converted into the sodium phenolate by heating to boiling with 40 grams of sodium hydroxide in 400–600 cc. of solution. The sodium phenolate may be recovered by direct evaporation over a free flame or by any other suitable method of evaporation. Care should be taken to prevent absorption of carbon dioxide by the solution or the incompletely dried phenolate. Final drying of the phenolate is carried out in vacuo, about 10 mm., at 180° C. for some time, usually five hours, after no more water is collected in an ice trap.

The dry pulverized phenolate is treated with carbon dioxide in an autoclave at approximately 90 pounds per square inch to form the sodium salt of 3-carboxy-4-hydroxy-diphenyl. The temperature is held at 110–120° C., for one hour, increased to 160–170° C., and held at the latter temperature for 3–4 hours. The reaction product is placed in 3000–4000 cc. of water, heated to boiling, and preferably after filtering, treated with carbon dioxide until no more 4-hydroxy-diphenyl is precipitated. The suspension is filtered to remove the unconverted 4-hydroxy-diphenyl and the 3-carboxy-4-hydroxy-diphenyl is precipitated by acidification with mineral acid. The product is then filtered off, washed with water and dried.

The invention is illustrated by the following examples, but it is not limited thereto:

EXAMPLE 1

3-beta-diethyl-amino-carbethoxy-4-ethoxy-diphenyl 214 grams of 3-carboxy-4-hydroxy-diphenyl is converted into the disodium derivative (sodium salt and sodium phenolate) by treatment with 80 grams of sodium hydroxide dissolved in 3000–4000 cc. of water. The mixture is boiled until all of the 3-carboxy-4-hydroxy-diphenyl has been dissolved and is then evaporated to dryness. Final drying is conveniently carried out by placing in an oven at 105–110° C. for several hours. The dry disodium compound is treated with 154 grams of ethyl sulfate, or more conveniently with a considerable excess over this amount, and heated for 3–4 hours at 145° C. During the early stages of heating, at 105–120° C., a small quantity of alcohol and ether is distilled off after which no further distillation takes place. Care must be taken to control the temperature to prevent decomposition of the ethyl sulfate with possible sulfonation of the 3-carboxy-4-hydroxy or the resulting ethylated derivative. Following the reaction period, the greater part of any excess of ethyl sulfate is removed by distillation in vacuo at a pressure of 13 mm. at about 100° C. The residue, which consists largely of sodium sulfate or sodium ethyl sulfate, depending on the excess of ethyl sulfate used, a small amount of ethyl sulfate and the ethyl ester of 3-carboxy-4-ethoxy-diphenyl is conveniently separated by boiling with water and mechanical separation of the hot aqueous solution from the water insoluble ester.

The crude ether ester, after separation from the aqueous solution of water soluble impurities is treated with an aqueous or aqueous-alcoholic solution of an excess of sodium or potassium hydroxide and boiled until a clear solution is obtained. This solution is filtered hot and, if an alcohol solution was used, evaporated to remove most of the alcohol. The free acid is then precipitated from the solution of its sodium or potassium salt by acidification with a mineral acid such as hydrochloric acid. This acid is purified by recrystallization from alcohol.

48.4 grams (0.2 mol.) of 3-carboxy-4-ethoxy-diphenyl is converted into the sodium salt by dissolving in an aqueous solution containing 8.0 grams (0.2 mol.) of sodium hydroxide. The dry sodium salt is obtained by evaporation to dryness followed by heating at a temperature of 110° C. or higher for several hours. The dry powdered sodium salt is treated either in a flask fitted with an efficient reflux condenser or in a sealed tube with an excess of ethylene bromide and heated for five hours. Using the preferred method of flask and reflux condenser, heating was accomplished with an oil bath at 150–155° C. and the reacting materials were mechanically agitated. At the end of the reaction period the solution of reaction products in ethylene bromide is filtered from the by-product sodium bromide and the excess of ethylene bromide is removed by distillation preferably under reduced pressure. The residue contains principally 3-beta-bromo-carbethoxy-4-ethoxy-diphenyl and the ethylene glycol diester. The beta-bromo ester may be separated from the mixture by means of a solvent such as ether and recovered by evaporation of the solvent.

34.9 grams (0.1 mol.) of 3-beta-bromocarbethoxy-4-ethoxy-diphenyl is treated with a fairly large excess over 14.6 grams (0.2 mol.) of diethylamine. If benzene or other solvent is added only a slight excess of diethyl-amine is required. The materials react slowly with a slight evolution of heat, to form a jelly-like mass intermixed with colorless crystals of diethyl-amine-hydrobromide. The mixture is heated for three hours in a water bath at 60° C.

The reaction products are separated by removal of the excess of diethyl-amine by evaporation, after which the residue is suspended in water and the aqueous suspension extracted with benzene. The resulting benzene extract after washing with water to remove any remaining diethyl-amine and diethyl-amine hydrobromide, contains principally the desired beta-diethyl-amino-ethyl-ester and some by-products which are insoluble in acid. The benzene solution is next extracted with dilute hydrochloric acid which removes the desired ester as its water soluble hydrochloride. The ester is then precipitated from the solution of its hydrochloride by neutralization with sodium hydroxide or other alkali and then taken up from the suspension by extraction with benzene. After drying with sodium sulfate, the benzene is removed by distillation and the residue distilled under reduced pressure. It has a boiling point of 195–205° C. at less than 1 mm. pressure.

The distillate, 3-beta-diethyl-amino-carbethoxy-4-ethoxy-diphenyl, is a nearly colorless, somewhat viscous oil which is soluble in benzene, ether, alcohol and several other organic solvents and as the hydrochloride in dilute hydrochloric acid.

Example 2

*3-gamma-di-n-butyl-amino-carbopropoxy-4-ethoxy-diphenyl*

48.4 grams (0.2 mol.) of 3-carboxy-4-ethoxy-diphenyl, which may be prepared as above described, is converted into the sodium salt by dissolving in an aqueous solution containing 8.0 grams of sodium hydroxide. The dry sodium salt is obtained by evaporation to dryness followed by heating at a temperature of 105–110° C. or higher for several hours. The dry powdered sodium salt is treated, either in a flask fitted with an efficient reflux condenser or in a sealed tube, with an excess of trimethylene bromide and heated for five hours. Using the preferred method of flask and reflux condenser heating was accomplished with an oil bath at 150–155° C., and the reacting materials were mechanically agitated. At the end of the reaction period, the solution of reaction products in trimethylene bromide is filtered from the by-product sodium bromide and the excess of trimethylene bromide is removed by distillation, preferably under reduced pressure. The residue contains principally 3-gamma-bromo-carbopropoxy-4-ethoxy-diphenyl and the trimethylene glycol diester. The gamma-bromo ester may be separated from the mixture by means of a solvent such as ether and recovered by evaporation of the solvent. The product is a pale yellow oil. It is insoluble in water and is completely saponified by boiling with dilute alkali solution. 3-carboxy-4-ethoxy-diphenyl is separated by acidification of the saponified material.

36.3 grams (0.1 mol.) of 3-gamma-bromo-carbopropoxy-4-ethoxy-diphenyl is treated with an excess over 25.8 grams (0.2 mol.) of di-n-butyl-amine. The materials react slowly with a slight evolution of heat to form a jelly-like mass intermixed with colorless crystals of di-n-butyl-amine-hydrobromide. The mixture is heated for three hours at 60° C.

The reaction products are separated by removal of the excess of di-n-butyl-amine by evaporation, after which the residue is suspended in water and the resulting aqueous suspension extracted with benzene. The benzene extract after washing with water, to remove any remaining di-n-butyl-amine and di-n-butyl-amine-hydrobromide, contains principally the desired gamma-di-n-butyl-amino-propyl-ester and some by-products which are insoluble in acid. The benzene solution is next extracted with dilute hydrochloric acid, which removes the desired ester as the water soluble hydrochloride. The ester is precipitated from the solution of its hydrochloride by neutralization with sodium hydroxide or other alkali and then taken up from the suspension by extraction with benzene. After drying with sodium sulfate, the benzene is removed by distillation and the residue distilled under reduced pressure.

The distillate, 3-gamma-di-n-butyl-amino-carbopropoxy-4-ethoxy-diphenyl is a nearly colorless oil with a boiling point of about 255–265° C. at 1 mm. It is soluble in benzene, ether, alcohol and several other organic solvents and as the hydrochloride in dilute hydrochloric acid.

Example 3

*3-beta-diethyl-amino-carbethoxy-4-n-butoxy-diphenyl*

42.8 grams (0.2 mol.) of 3-carboxy-4-hydroxy-diphenyl is converted into the disodium derivative by treatment with 16 grams of sodium hydroxide dissolved in 600–800 cc. of water. The mixture is boiled until all of the 3-carboxy-4-hydroxy-diphenyl has been dissolved and is then evaporated to dryness. Final drying is conveniently carried out by placing in an oven at 105–110° C. for several hours.

The dry disodium compound is treated with an excess over 54.8 grams (0.4 mol.) of n-butyl-bromide and heated preferably in a closed vessel in a bath maintained at 130° C. for five hours. After cooling, the n-butyl-ester of 3-carboxy-4-n-butoxy-diphenyl and excess of n-butyl-bromide is filtered from the by-product sodium bromide and the excess of n-butyl-bromide removed by distillation. The residue consists principally of the n-butyl-ester of 3-carboxy-4-n-butoxy-diphenyl.

The free acid, 3-carboxy-4-n-butoxy-diphenyl, is obtained by saponification of its n-butyl-ester with dilute aqueous-alcoholic solution of sodium hydroxide and precipitation of the free acid from the resulting sodium salt by acidification with mineral acid, such as hydrochloric acid. It is preferable to remove the greater part of the alcohol from the saponification mixture before the acid precipitation.

The compound may be filtered off, dried and purified by crystallization from a mixture of benzene and petroleum ether, or from approximately 60 percent alcohol. The pure material crystallizes in pure white crystals with a melting point of 83.5–84.5° C. (corrected). It is soluble in alcohol, ether, benzene, chloroform and several other organic solvents.

54 grams (0.2 mol.) of 3-carboxy-4-n-butoxy-diphenyl is converted into the sodium salt by dissolving in an aqueous solution containing 8.0 grams of sodium hydroxide. The dry sodium salt is obtained by evaporation to dryness followed by heating at a temperature of 105–110° C. or higher for several hours. The dry powdered sodium salt is treated, either in a flask fitted with an efficient reflux condenser or in a sealed tube, with an excess of ethylene bromide and heated for five hours. Using the preferred method of flask and reflux condenser, heating was accomplished with an oil bath at 150–155° C., and the reacting materials were mechanically agitated. At the end of the reaction period, the solution of reaction products in ethylene bromide is filtered from the by-product sodium bromide and the excess of ethylene bromide is removed by distillation, preferably under reduced pressure. The residue contains principally 3-beta-bromo-carbethoxy-4-n-butoxy-diphenyl and the ethylene glycol diester. The beta-bromo ester may be separated from the mixture by means of a solvent, such as ether and recovered by evaporation of the solvent. The product is a pale yellow oil. It is soluble in alcohol, ether, ethylene bromide and several other organic solvents. The compound is relatively stable in water and is completely saponified by boiling with dilute alkali solution. 3-carboxy-4-n-butoxy-diphenyl is separated by acidification of the saponified material.

37.7 grams (0.1 mol.) of 3-beta-bromo-carbethoxy-4-n-butoxy-diphenyl is treated with an excess over 14.6 grams (0.2 mol.) of diethyl-amine. The materials react slowly with a slight evolution of heat to form a jelly-like mass intermixed with colorless crystals of diethyl-amine-hydrobromide. The mixture is heated for three hours at 60° C.

The reaction products are separated by removal of the excess of diethyl-amine by evaporation, after which the residue is suspended in water and the resulting aqueous suspension extracted with benzene. The benzene extract after washing with water, to remove any remaining diethyl-amine and diethyl-amine-hydrobromide, contains principally the desired beta-diethyl-amino-ethyl ester and some by-products which are insoluble in acid. The benzene solution is next extracted with dilute hydrochloric acid which removes the desired ester as the water soluble hydrochloride. The ester is then precipitated from the solution of its hydrochloride by neutralization with sodium hydroxide or other alkali and then taken up from the suspension by extraction with benzene. After drying with sodium sulfate, the benzene is removed by distillation and the residue distilled under reduced pressure.

The distillate, 3-beta-diethyl-amino-carbethoxy-4-n-butoxy-diphenyl is a nearly colorless oil with a boiling point of approximately 210–220° C. at 1.0 mm. It is soluble in benzene, ether, alcohol and several other organic solvents, and as the hydrochloride in dilute hydrochloric acid.

EXAMPLE 4

*3-beta-diethyl-amino-carbethoxy-2-ethoxy-diphenyl*

42.8 grams (0.2 mol.) of 2-hydroxy-3-carboxy-diphenyl is converted into the disodium derivative (sodium salt and sodium phenolate) by treatment with 16 grams of sodium hydroxide and sufficient water to make a clear solution. The disodium derivative is recovered by direct evaporation and finally completely dried by heating at 105–110° C. for several hours in an oven, avoiding excessive contact with air or carbon dioxide, or more conveniently in a vacuum drying apparatus. The dry disodium compound is then treated with somewhat more than 43.6 grams (0.4 mol.) of ethyl-bromide, 75 grams is a convenient amount, and heated at about 100° C., or above, for five hours in an autoclave. The excess of ethyl-bromide is removed by evaporation or distillation and the residue (which consists largely of sodium bromide and the ethyl ester of 2-ethoxy-3-carboxy-diphenyl) placed in water, heated for a short time and the ester-ether separated mechanically from the aqueous solution.

The free acid 2-ethoxy-3-carboxy-diphenyl is obtained by saponification of its ethyl ester with sodium hydroxide and precipitation of the ethoxy acid from the resulting sodium salt by acidification with a mineral acid such as hydrochloric acid. The compound may be filtered off, dried and purified by crystallization from a mixture of one part of benzene and 2.5 parts of petroleum ether. The pure material crystallizes as white needles with a melting point of 97–98° C. (corrected). It is soluble in alcohol, ether, benzene, chloroform, acetone, ethyl acetate and several other organic solvents.

48.4 grams (0.2 mol.) of 2-ethoxy-3-carboxy-diphenyl is converted into the sodium salt by dissolving in an aqueous solution containing 8.0 grams of sodium hydroxide. The dry sodium salt is obtained by evaporation to dryness followed by heating at a temperature of 105–110° C. or higher for several hours. The dry powdered sodium salt is treated, either in a flask fitted with an efficient reflux condenser or in a sealed tube, with an excess of ethylene bromide and heated for five hours. Using the preferred method of flask and reflux condenser, heating was accomplished with an oil bath at 150–155° C., and the reacting materials were mechanically agitated. At the end of the reaction period, the solution of reaction products in ethylene bromide is filtered from the by-product sodium bromide and the excess of ethylene bromide is removed by distillation, preferably under reduced pressure. The residue contains principally 2-ethoxy-3-beta-bromo-carbethoxy-diphenyl and the ethylene glycol diester. The beta-bromo ester may be separated from the mixture by means of a solvent, such as ether, and recovered by evaporation of the solvent. The product is a pale yellow oil. It is soluble in alcohol, ether, ethylene bromide and several other organic solvents. The compound is relatively stable in water and is completely saponified by boiling with dilute alkali solution. 2-ethoxy-3-carboxy-diphenyl is separated by acidification of the saponified material.

34.9 grams (0.1 mol.) of 2-ethoxy-3-beta-bromo-carbethoxy-diphenyl is treated with an excess over 14.6 grams (0.2 mol.) of diethyl-amine. The materials react slowly with a slight evolution of heat to form a jelly-like mass intermixed with colorless crystals of diethyl-amine-hydro-bromide. The mixture is heated for three hours at 60° C.

The reaction products are separated by removal of the excess of diethyl-amine by evaporation, after which the residue is suspended in water and the resulting aqueous suspension extracted with benzene. The benzene extract after washing with water, to remove any remaining diethyl-amine and diethyl-amine-hydrobromide, contains principally the desired beta-diethyl-amino-ethyl-ester and some by-products which are insoluble in acid. The benzene solution is next extracted with dilute hydrochloric acid, which removes the desired ester as the water soluble hydrochloride. The ester is then precipitated from the solution of its hydrochloride by neutralization with sodium hydroxide or other alkali and then taken up from the suspension by extraction with benzene. After drying with sodium sulfate, the benzene is removed by distillation and the residue distilled under reduced pressure.

The distillate, 2-ethoxy-3-beta-diethyl-amino-carbethoxy-diphenyl is a nearly colorless oil having a boiling point of about 180-190° C. at 1.0-1.5 mm. It is soluble in benzene, ether, alcohol and several other organic solvents and as the hydrochloride in dilute hydrochloric acid.

Other dialkyl-amino-carbalkoxy derivatives of 2-alkoxy-diphenyl may be prepared by using the proper alkylating reagents. A dibutyl-amino-alkyl-ester may be prepared by treating a bromo alkyl-ester with di-butyl-amine in the manner indicated by Example 2. A propylene group may be substituted for the ethylene group in the manner also indicated in that example. Other ortho-ethers, such as butoxy derivatives, may be prepared. The ethyl groups and the ethylene group of the product of Example 4 may be replaced by various alkyl and alkylene groups.

The invention is not limited to dialkyl-amino-alkyl-esters of 2-alkoxy and 4-alkoxy-3-carboxy-diphenyl, but also includes dialkyl-amino-alkyl-esters of 3-alkoxy-4-carboxy-diphenyl, for example 4-beta-diethyl-amino-carbethoxy-3-ethoxy-diphenyl and derivatives containing other alkyl and alkylene groups. The invention includes, also, salts of such compounds, and anesthetics which contain dialkyl-amino-alkyl-esters of alkoxy-carboxy-diphenyls, or salts thereof, which have anesthetic properties.

By treating the proper starting material with appropriate alkyl compounds the various compounds of this invention may be prepared. The specific examples refer to the preparation of ethoxy and butoxy derivatives. Other alkoxy derivatives may be prepared by using other alkyl halides or salts such as methyl sulfate in the preparation of methoxy derivatives and alkyl sulfites or para toluene sulfonates for the preparation of derivatives containing more than two carbon atoms in the alkoxy group. The examples given include diethyl and dibutyl-amino-alkyl-esters and dialkyl-amino-carbethoxy and carbo-propoxy derivatives. By a suitable choice of reagents various alkyl substituted amino-carbalkoxy-derivatives may be produced as will be evident to the man skilled in the art. For example, instead of employing ethylene dibromide or propylene dibromide, other dihalogen aliphatic compounds such as butylene dibromide, etc. may be employed to form other esters. Other dialkyl-amino-derivatives may be formed by employing methyl-ethyl-amine or dipropyl-amine, etc. in converting the bromo-alkyl ester to the dialkyl-amino-alkyl ester. Branched chain compounds may be formed as well as the straight chain compounds.

Hydrochlorides of the bases of this invention may be formed by dissolving the base in ether or other suitable solvents and passing hydrochloric acid gas through the solution. For example, by dissolving 1 mol. of 3-beta-diethyl-amino-carbethoxy-4-ethoxy-diphenyl in 50 cc. of ether and then passing hydrochloric acid gas through the solution, an oil separates which on heating to drive off the excess hydrochloric acid becomes a solid which is the hydrochloride.

Borates may be formed by dissolving a base in aqueous boric acid containing, for example, 4 molecules of boric acid, and then evaporating to dryness.

In general, the bases of this invention are insoluble in water so that water solutions for anesthetic purposes are produced from salts of the bases such as the hydrochlorides or borates, etc. Aqueous solutions of these salts are advantageously buffered with an alkaline salt such as a phosphate to increase the pH value of the solution. An aqueous solution of several percent of a water soluble salt preferably with the addition of a suitable buffering agent has been found suitable as a local anesthetic, for example, a two percent solution of the hydrochloride of 3-beta-diethyl-amino-carbethoxy-4-ethoxy-diphenyl buffered with sodium phosphate. Similarly buffered aqueous solutions containing several percent of a suitable salt of 3-gamma-di-n-butyl-amino-carbopropoxy-4-ethoxy-diphenyl, 3-beta-diethyl-amino-carbethoxy-4-n-butoxy-diphenyl, and 3-beta-diethyl-amino-carbethoxy-2-ethoxy-diphenyl, etc. may be used as anesthetics.

We claim:
1. A compound from the group consisting of dialkyl-amino-alkyl esters of alkoxy-carboxy-diphenyls and inorganic salts thereof.
2. As new compounds dialkyl-amino-alkyl esters of 3-carboxy-diphenyl having the general formula:

$$C_{12}H_8(OR_1)COOR.NR_2R_3$$

in which R, $R_1$, $R_2$ and $R_3$ are alkyl groups.
3. As new compounds inorganic salts of the esters of claim 2.
4. As new compounds, esters having the following general formula:

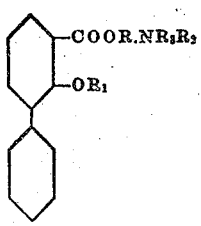

in which R, $R_1$, $R_2$ and $R_3$ are alkyl groups.
5. As new compounds inorganic salts of the esters of claim 4.

6. As new compounds, esters having the general formula:

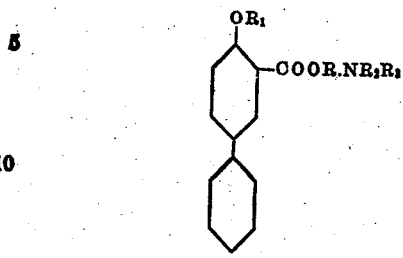

where R, R₁, R₂ and R₃ are alkyl groups.

7. As new compounds, inorganic salts of the esters of claim 6.

8. As anesthetics solutions containing several percent of a compound from the group consisting of dialkyl-amino-alkyl esters of alkoxy-carboxy-diphenyls and inorganic salts thereof.

9. As anesthetics aqueous solutions containing several percent of a compound from the group consisting of dialkyl-amino-alkyl esters of 2-alkoxy and 4-alkoxy-3-carboxy-diphenyls and inorganic salts thereof.

10. As local anesthetics buffered aqueous solutions of inorganic salts of dialkyl-amino-alkyl esters of 3-carboxy-4-alkoxy-diphenyls.

11. As local anesthetics buffered aqueous solutions of inorganic salts of dialkyl-amino-alkyl esters of 3-carboxy-2-alkoxy-diphenyls.

WALTER G. CHRISTIANSEN.
ADELBERT W. HARVEY.